United States Patent
Lekeberg et al.

(10) Patent No.: US 10,920,993 B2
(45) Date of Patent: Feb. 16, 2021

(54) SYSTEM, METHOD AND A FILTER FOR VENTILATION

(71) Applicant: Enjay AB, Furulund (SE)

(72) Inventors: Nils Lekeberg, Furulund (SE);
Bengt-Göran Karlsson, Klippan (SE);
Hans Lekeberg, Eslöv (SE)

(73) Assignee: ENJAY AB, Furulund (SE)

( * ) Notice: Subject to any disclaimer, the term of this patent is extended or adjusted under 35 U.S.C. 154(b) by 190 days.

(21) Appl. No.: 16/081,126

(22) PCT Filed: Mar. 1, 2017

(86) PCT No.: PCT/SE2017/050190
§ 371 (c)(1),
(2) Date: Aug. 30, 2018

(87) PCT Pub. No.: WO2017/151046
PCT Pub. Date: Sep. 8, 2017

(65) Prior Publication Data
US 2019/0063756 A1  Feb. 28, 2019

(30) Foreign Application Priority Data

Mar. 2, 2016 (SE) .................................... 1650280-9
Dec. 14, 2016 (SE) .................................... 1651643-7

(51) Int. Cl.
*F24C 15/20* (2006.01)
*B08B 15/02* (2006.01)
(Continued)

(52) U.S. Cl.
CPC .......... *F24C 15/2035* (2013.01); *B01D 47/05* (2013.01); *B08B 9/027* (2013.01);
(Continued)

(58) Field of Classification Search
CPC ...... F24C 15/2035; B01D 47/05; B08B 15/02
(Continued)

(56) References Cited

U.S. PATENT DOCUMENTS 3,077,084 A  2/1963  De Kanter
5,358,540 A  10/1994  Tsan-Yun et al.
(Continued)

FOREIGN PATENT DOCUMENTS

CN  2828606 Y  10/2006
CN  104819499 A  8/2015
(Continued)

OTHER PUBLICATIONS

International Search Report for corresponding International Application No. PCT/SE2017/050190 dated Jul. 4, 2017.
(Continued)

*Primary Examiner* — Steven B McAllister
*Assistant Examiner* — Aaron H Heyamoto
(74) *Attorney, Agent, or Firm* — Renner, Otto, Boissette & Sklar, LLP

(57) ABSTRACT

A ventilation system configured to be self-cleaning, wherein said ventilation system includes: a filtration unit configured to filter exhaust air led through it by at least one air duct; a condensation chamber configured to collect condensation water from the exhaust air; a heating element configured to heat the condensation water to a temperature equal to or above 65 degrees Celsius; and a sprinkler system configured to sprinkle the condensation water in one or more of the filtration unit, at least one of the at least one air duct, and/or the condensation chamber, wherein the ventilation system is thus configured to provide a self-cleaning of the ventilation system utilizing the condensation water.

18 Claims, 9 Drawing Sheets

(51) Int. Cl.
*B01D 47/05* (2006.01)
*B08B 9/027* (2006.01)
*B08B 9/032* (2006.01)
*B01D 46/00* (2006.01)

(52) U.S. Cl.
CPC .............. *B08B 9/032* (2013.01); *B08B 15/02* (2013.01); *B01D 46/0082* (2013.01)

(58) Field of Classification Search
USPC ...................................................... 126/299 E
See application file for complete search history.

(56) References Cited

U.S. PATENT DOCUMENTS

| | | | | |
|---|---|---|---|---|
| 5,359,990 | A | * | 11/1994 | Hsu ..................... F24C 15/2042 126/299 D |
| 5,860,412 | A | * | 1/1999 | Way ....................... B01D 45/18 126/299 E |
| 8,378,834 | B1 | | 2/2013 | Glaub et al. |
| 2010/0242737 | A1 | * | 9/2010 | Liu ..................... B01D 46/0032 96/233 |
| 2012/0132071 | A1 | | 5/2012 | Kusuura |
| 2016/0298859 | A1 | * | 10/2016 | Horvath ................ F24C 15/322 |

FOREIGN PATENT DOCUMENTS

| | | | |
|---|---|---|---|
| DE | 10 2004 037 930 A1 | 2/2006 | |
| DE | 102004037930 A1 * | 2/2006 | .......... F24C 15/2057 |
| DE | 10 2012 105 906 A1 | 1/2014 | |
| GB | 2 076 527 A | 12/1981 | |
| GB | 2 207 746 A | 2/1989 | |
| KR | 101390981 B1 | 5/2014 | |
| SE | 1451493 A1 | 6/2015 | |
| WO | 2004/024297 A1 | 3/2004 | |
| WO | WO-2004024297 A1 * | 3/2004 | ............ B01D 45/14 |
| WO | 2007/121461 A2 | 10/2007 | |

OTHER PUBLICATIONS

Written Opinion of the International Searching Authority for corresponding International Application No. PCT/SE2017/050190 dated Jul. 4, 2017.
International Preliminary Report on Patentability for corresponding International Application No. PCT/SE2017/050190 dated Jun. 7, 2018.

* cited by examiner

SYSTEM, METHOD AND A FILTER FOR VENTILATION

This application is a national phase of International Application No. PCT/SE2017/050190 filed Mar. 1, 2017, and claims priority to Swedish Application No. 1650280-9 filed on Mar. 2, 2016 and Swedish Application No. 1651643-7 filed Dec. 14, 2016, which are incorporated herein by reference.

TECHNICAL FIELD

This invention relates to a filter and to a ventilation system, a centrifugal separation filter, a heat pump, and a cleaning system for a ventilation system for use in a kitchen, and in particular for use in industrial and/or professional kitchens.

BACKGROUND

Large kitchen ventilation systems are designed to transport the air from a kitchen in order to extract heat, moisture and cooking fumes. Due to the culinary activities the air in a kitchen contains a lot of smoke and grease and therefore some kitchen ventilation systems includes equipment to clean or purify the air before the air reaches components that are prone to clog up, such as fans, heat exchangers and air filters. The cleaning of the air is usually performed using an air cleaning device that also has to be cleaned to prevent it from clogging up. Cleaning the filter and other parts of the ventilation system usually requires dismantling at least parts of the ventilation system and especially the filtration unit.

Kitchen ventilation without air cleaning devices, or with air cleaning devices that do not function optimally, will have issues with grease depositing both in the duct system and in other components such as fans, heat exchangers and air filters. The grease deposits affect the long-term operation of these components and—being highly combustible—the grease also represents an elevated fire risk. Therefore, for fire safety reasons, there are ordinances that regulate how often ventilation systems need to be cleaned, or how dirty they may be before having to be cleaned.

When cleaning the ventilation system, it needs to be turned off and at least partially dismantled. This is of course disruptive to the business associated with the kitchen.

There is thus need for kitchen ventilation that is less prone to clog up.

Furthermore, as in all aspects of society there is a need for saving energy and so is also true for kitchens, professional and private.

In kitchen ventilation systems there is always a need for an improved manner of filtrating the kitchen exhaust air, that is the air being generated by various cooking processes. As has been discussed above, this air is usually moist and full of fat particles (possibly along with other particles such as dust or smoke).

SUMMARY

It is an object of the present invention to overcome or at least mitigate the drawbacks of the prior art. The inventors have realized, through insightful and inventive reasoning that by utilizing the humidity of kitchen air an environmental friendly manner of self-cleaning ventilation systems may be provided that recycles this humidity as cleaning water.

Also, the inventors have further realized that by utilizing a heat pump both for cooling the air to condensate the water in the air, and the hot gas conduit to heat the condensation water to a temperature high enough to solve the grease to be cleaned from the system, a recycling of energy is achieved and the efficiency of the heat pump is even improved which actually reduces the power needed by the heat pump.

The inventors have also realized that the use of centrifugal separation filters is highly beneficial in kitchen ventilation systems as will be discussed in detail below.

According to one aspect the problems of the background art are solved or at least mitigated by providing a ventilation system configured to be self-cleaning, wherein said ventilation system comprises: a filtration unit configured to filter exhaust air led through it by at least one air duct; a condensation chamber configured to collect condensation water from the exhaust air; a heating element configured to heat the condensation water to a temperature equal to or above 65 degrees Celsius; and a sprinkler system configured to sprinkle the condensation water in one or more of the filtration unit, at least one of the at least one air duct, and/or the condensation chamber, wherein the ventilation system is thus configured to provide a self-cleaning of the ventilation system utilizing the condensation water.

In one embodiment the heating element is a hot gas conduit of a heat pump. This enables for a power saving manner of heating the water which also increases the efficiency of the heat pump.

In one embodiment the condensation chamber is comprised in a battery part of a heat pump. This further increases the efficiency of the heat pump as the condensation process may be used to generate energy from the passing air.

In one embodiment, the filtration device comprises one or more centrifugal separation filters, such as that disclosed in WO04024297. By realizing that a centrifugal separation filter may be used, and especially when run in reverse, it is possible to obtain a filtration or cleaning of the air that is adequate for later extracting the condensation from. Should the air contain too much grease, the resulting condensation water would also contain too much grease and the grease would simply be circulated in the system, causing even more build up. The ventilation system according to herein, with the use of the centrifugal separation filter, is thus highly beneficial.

In one embodiment, the filtration unit comprises a triple action filter as disclosed with reference to FIGS. 11A, 11B, 11C and 12.

According to one aspect there is provided a method for use in a ventilation system configured to be self-cleaning, wherein said method comprises: filtering exhaust air led through a filtration unit by at least one air duct; collecting condensation water from the exhaust air in a condensation chamber; heating the condensation water to a temperature equal to or above 65 degrees Celsius with a heating element; and sprinkling the condensation water in one or more of the filtration unit, at least one of the at least one air duct, and/or the condensation chamber using a sprinkler system, thereby providing self-cleaning of the ventilation system utilizing the condensation water.

According to one aspect there is provided a heat pump comprising a battery part and a hot gas conduit, said heat pump being configured for use in a ventilation system wherein the heat pump is configured to collect condensation water in the battery part and heat the collected condensation water utilizing the hot gas conduit.

According to one aspect there is provided a sprinkler system for use with a ventilation system, the sprinkler system being configured to receive condensation water and to deliver it through a sprinkler conduit to sprinkler nozzles for sprinkling the condensation water in the ventilation system for cleaning the ventilation system.

According to one aspect there is provided a heat pump adapted to be used in a ventilation system according to above and/or for heating condensation water to be delivered to a sprinkler system according to above.

According to one aspect there is provided a sprinkler system adapted to be used in a ventilation system according to above.

According to one aspect there is provided a ventilation system according to FIG. 1, and a heat pump, a filter and a sprinkler system to be used in such a system.

According to one aspect there is provided a ventilation system according to FIG. 4, arranged for self-cleaning using condensation water retrieved from the ventilated air according to the teachings herein and a heat pump, a filter and a sprinkler system to be used in such a system.

According to one aspect there is provided a ventilation system according to FIG. 6 arranged for cleaning of a ventilation system by using condensation water, wherein the condensation water is heated by the hot gas conduit of a heat pump according to the teachings herein, and a heat pump, a filter and a sprinkler system to be used in such a system.

According to one aspect there is provided a sprinkler system according to FIG. 8, a heat pump, a filter and a ventilation system to be used with such a sprinkler system.

A simple and elegant solution is thus provided that recycles energy and (condensation) water for providing a self-cleaning ventilation system.

Through the teachings of this application, there is provided a ventilation system with improved extraction of grease from the air, which system is able to keep the ventilation system and all its components down-stream relatively free from grease and at the same time open for the possibility to engage a heat exchanger or even contain the heat exchanger. The air cleaning apparatus itself is also designed not to clog up in any components internal to the air cleaning apparatus or ventilation system.

The inventors have also provided a novel and inventive filtration unit for filtering particularly fat particles from the exhaust air. In one aspect a filtration unit is provided comprising a triple action filter arranged to receive a flow of gas to be filtered, said filter comprising a plurality of pipes, wherein the pipes are arranged in at least two pipe rows. The pipe rows are arranged so that the pipes in one row overlap with the pipes in an adjacent pipe row to enhance the likelihood of a collision between a pipe and a particle in the flow.

The pipes are also arranged to be cooled by receiving and transporting a coolant, whereby the pipes will have a cooling effect on the flow of gas and any particles in the flow thereby providing an attraction force between the particles for increasing the likelihood of a collision with a pipe.

And, at least one of the pipes is formed so that a low pressure area is formed behind the pipe when subjected to a flow thereby providing a filtering effect by sucking particles into the low pressure region and thereby causing a collision with the pipe.

Such filtration unit may beneficially be used as a filtration unit in the ventilation system disclosed herein.

According to another aspect a method is also provided to solve or at least mitigate the problems discussed herein. The method is for use in filter, wherein the method comprises arranging pipes in overlapping rows, cooling the pipes, provide a flow of gas to be filtered, filter particles through collision, filter particles by cooling the particles, allowing the cooled particles to clump together, and subsequently colliding with a pipe in a second pipe group, and filter the particles by forming a low pressure region by the flow passing a pipe and the particles being sucked or drawn into the low pressure region and thereby colliding with a pipe.

As the filtration unit is arranged to extract moisture from the exhaust air and to condensate this and collect the condensation, it may also serve as a condensation chamber (referenced 6a in the figures discussed below) of the ventilation system.

Such a filtration unit may also or alternatively be used in other ventilation systems or as a standalone filtration unit.

SHORT DESCRIPTION OF THE DRAWINGS

The invention will be disclosed below with reference to the following figures, where FIG. 1 shows a schematic view of a ventilation system 1 according to one embodiment of the teachings herein;

Figure 11A:
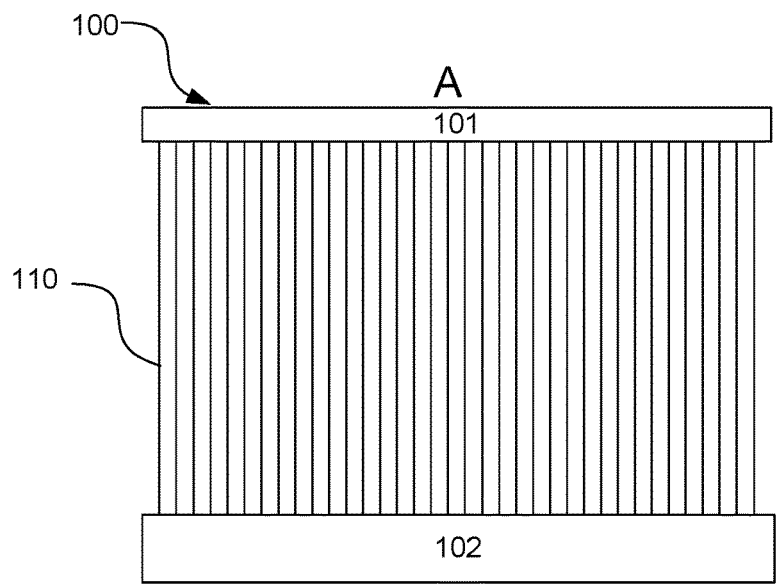
Figure 11B:
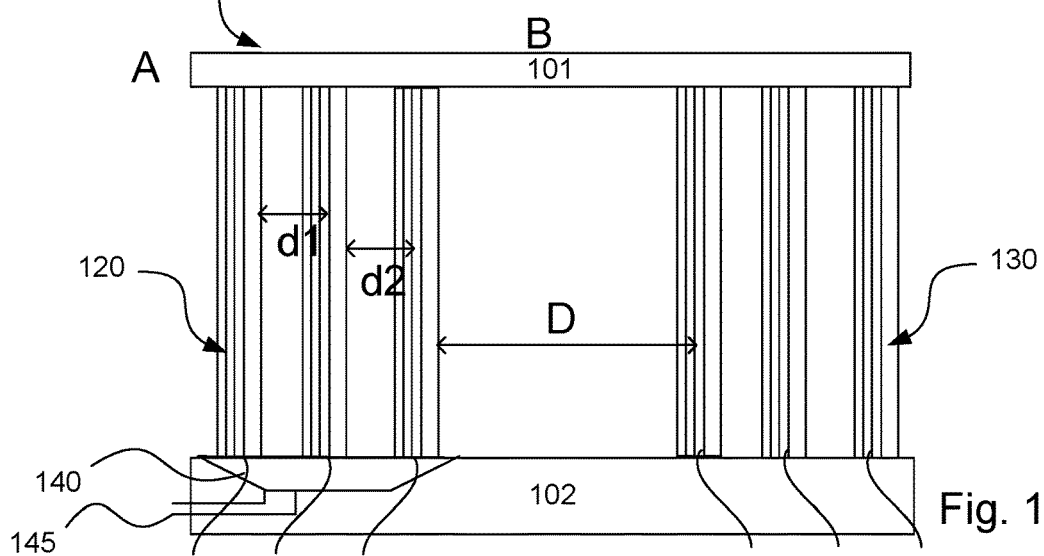
Figure 11C:
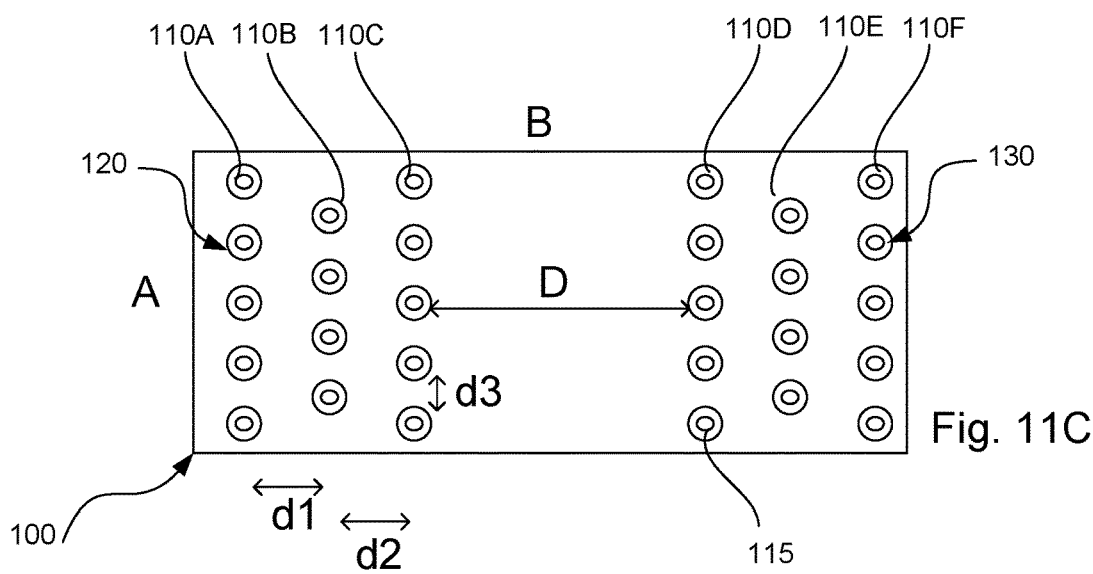
Figure 12:
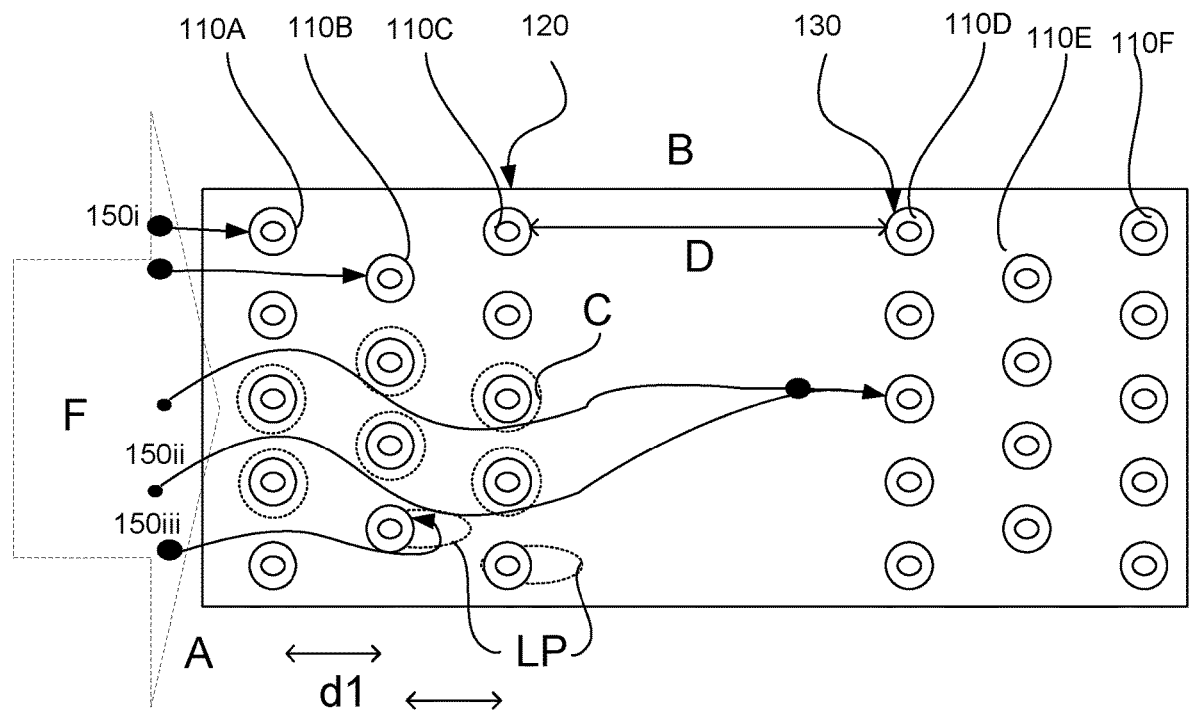
Figure 13:
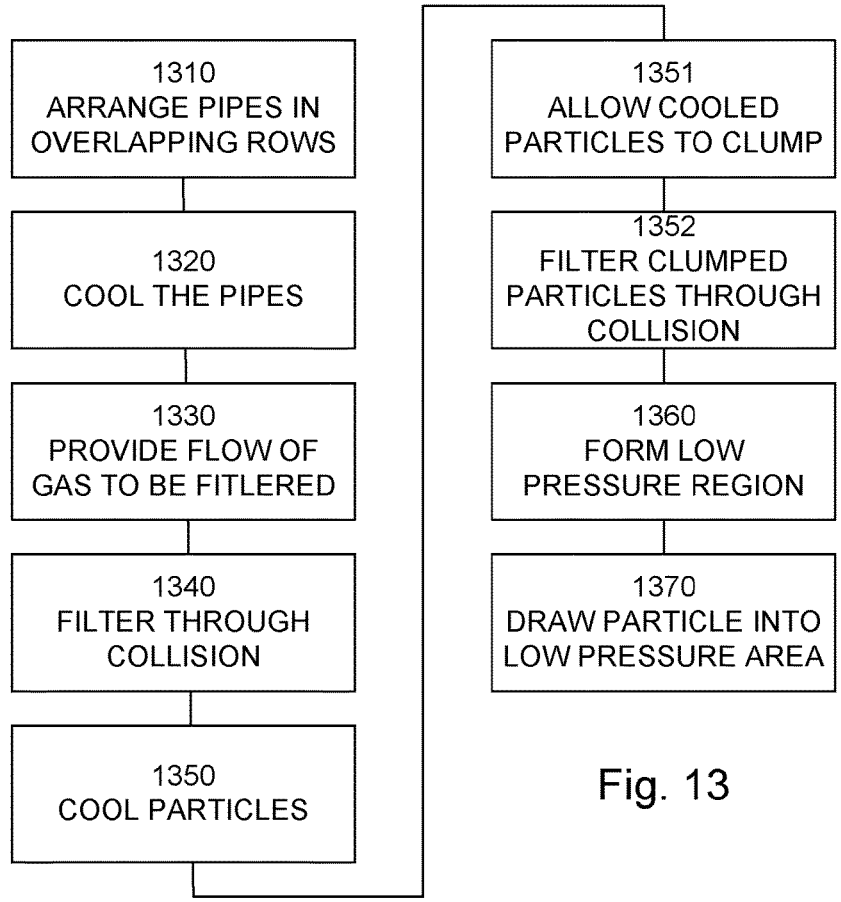

FIGS. 11A, 11B and 11C each shows a schematic side view of a filter according to one embodiment of the teachings herein;

FIG. 12 shows a schematic view of a filter and its functionality during operation according to one embodiment of the teachings herein; and FIG. 13 is a flowchart of an exemplary gas filling process using the filter according to one embodiment of the teachings herein.

DETAILED DESCRIPTION

Figure 1:
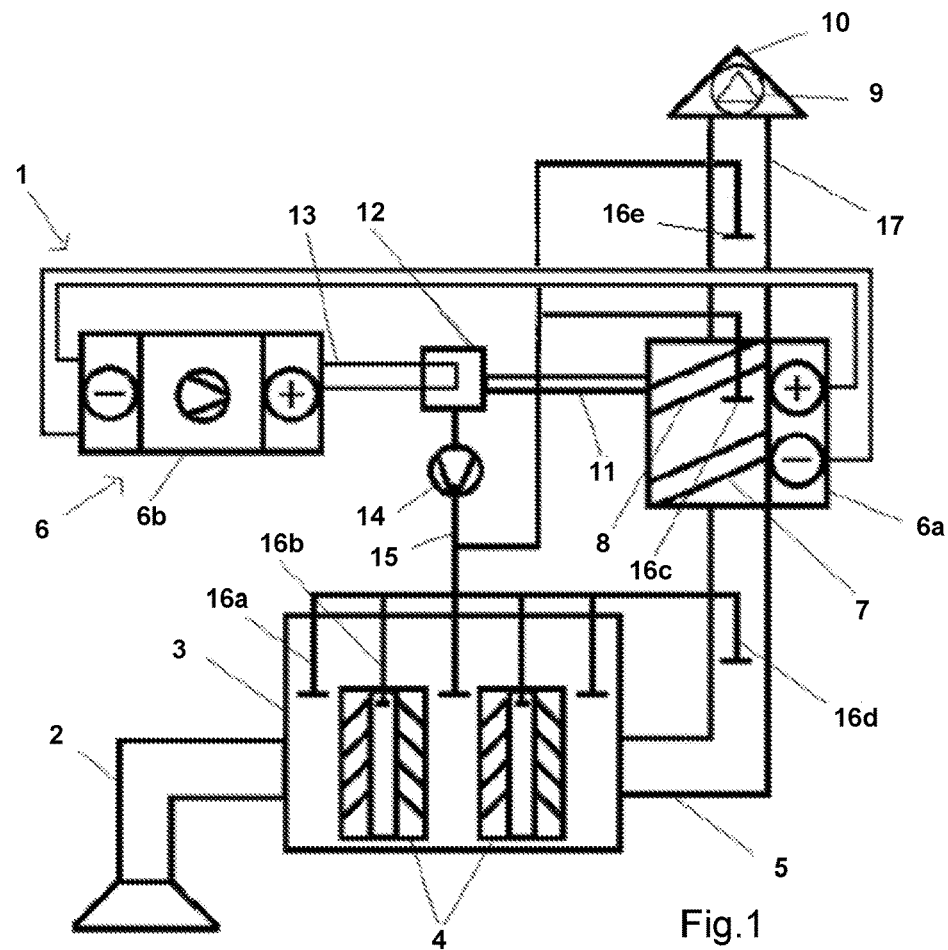

FIG. 1 shows a schematic view of a ventilation system 1 according to the teachings herein. The ventilation system 1 comprises a canopy connected to a first air duct 2 through which the kitchen air is led to a filtration unit 3. The kitchen air may be sucked through the first air duct 2 through the use of a fan 9, possibly part of the filtration unit 3, located further down the air canal, possibly in an air outlet 10.

The filtration unit 3 may comprise one or more filters 4. In one embodiment the one or more filters 4 are centrifugal separation filters 4. For details on the operation of a centrifugal separation filter, reference is given to WO04024297.

In one embodiment, the filtration unit 3 may comprise a triple action filter 100 as detailed with reference given to FIGS. 11A, 11B, 11C and 12. In one embodiment, the filtration unit comprises a combination of centrifugal filters 4 and triple action filters 100.

By configuring the filter 3 to filter out all particles larger than 1.4 micrometers, effectively 98% of all grease is filtered from the air. Naturally, other particle sizes can be used leading to different filtration rates.

Figure 2:
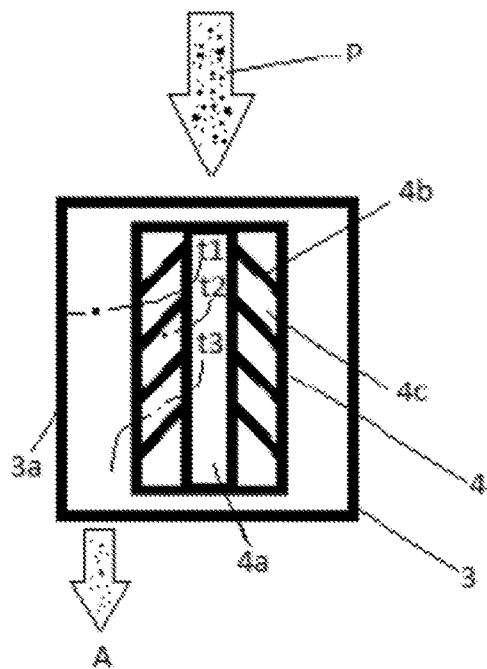
FIG. 2 shows a schematic cross section view of filtration unit according to one embodiment of the teachings herein.

FIG. 2 shows a schematic cross section view of filtration unit 3 having a filter 4,100 being a centrifugal separation filter 4, such as disclosed in WO04024297. Alternatively the filter may be triple action filter 100.

Even though it should be clear that the centrifugal separation filter 4 and the triple action filter 100 may both be used (alone or in combination) in a ventilation system according to herein, the description will focus on using the centrifugal separation filter 4.

The centrifugal separation filter 4 comprises circular flange discs 4b arranged at an angle of for example 45 degrees. The circular flange discs 4b are arranged to rotate. In one example the peripheral (rim) speed is 50 m/s. As grease particles P enter the filter 4 through a center channel 4a they are subjected to mainly two forces, a gravitational force acting vertically and a centrifugal force acting horizontally (for a filter arranged as in FIG. 2). In other arrangements, and also in this example embodiment, other forces may act on the grease particle such as the inertia of the grease particle or a fan acting on the flow of air to mention a few forces.

Due to the centrifugal force, the grease particles are sucked through the passages 4c between the flange discs 4b. Depending on the weight of the grease particle it will follow one of three possible trajectories t1, t2 and t3. Heavy particles will follow trajectory t1 as they will fall fast enough to not hit one of the flange discs 4b and due to their mass and the velocity they pick up when passing through the revolving filter 4 they will hit a wall 3a of the filtration unit 3. Small particles will follow trajectory t3 as their lower mass will not permit them to accumulate velocity quickly enough and will thus have time to fall while being hurled horizontally enabling them to miss the rotating disc flanges 4b. However, as they have a small mass they will not have gained high enough speed to reach the wall 3a and will continue to fall/flow down to the bottom of the filtration unit 3 where they will follow the filtered air A. Medium sized particles will follow trajectory t2 and hit one of the rotating flange discs 4b. There they will stick and clump together with other medium sized particles. As they do that, a larger particle is formed that will eventually grow enough in size so that the centrifugal force overcomes any bonding force and hurls the grease particle out of the filter 4 and into the wall 3a.

By arranging the rotating discs 4 to only allow grease particles of less than 1.4 micro meters to escape, 98% of all grease will be effectively filtered out. This allows for the condensation chamber 6a to be used even without a sprinkler 16d, 16e, or at least to be cleaned less often. As a skilled person would understand after having read the content herein and possibly consulted WO04024297, the size, the angle and the speed of the disc flanges 4b, the width of the channel 4a and the spacing 4c of the flanges as well as the distance from the filter 4 to the wall 3a depends on the overall dimensions of the filter 4.

Figure 3:
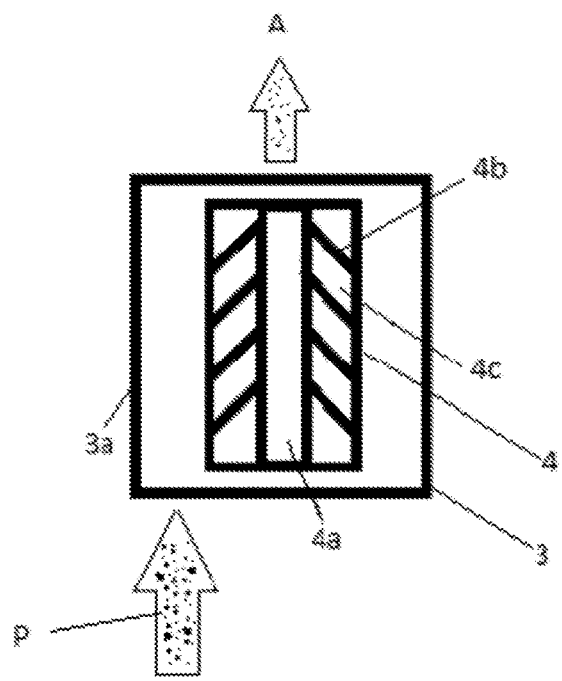
FIG. 3 shows a schematic cross section view of filtration unit according to one embodiment of the teachings herein.

In one embodiment, the filter 4 is arranged to operate in reverse and thus to receive the air to be filtered from the side or bottom, that is outside the rotating flange discs 4b. This has the benefit that the larger or heavier grease particles will never enter the filter, but will be hurled directly into the wall 3a simply by the force of the turbulence of the rotating discs 4b, which will increase the efficiency of the filtering and also keep the disc flanges cleaner, see FIG. 3.

Returning to FIG. 1, the filtered air is led through a second air duct 5 to a condensation chamber 6a.

As is known, a heat pump 6 is a device that provides heat energy from a source of heat to a destination called a "heat sink". Heat pumps are designed to move thermal energy opposite to the direction of spontaneous heat flow by absorbing heat from a cold space and releasing it to a warmer one. A heat pump 6 uses some amount of external power to accomplish the work of transferring energy from the heat source to the heat sink. The external power may be provided (at least in part) through a battery part. Such a battery part may comprise one or more battery devices that are configured to extract energy through passing air. One example of such a battery device is a battery device configured to extract the inherent energy in the exhaust air mainly utilizing the difference in temperature between the warm exhaust air and the cooler refrigerant inside the battery. Another example of such a battery device is a battery device configured to extract the inherent energy in the exhaust air mainly utilizing the power of condensation which is forced to take place on the chilled surface of the device.

In one embodiment the condensation chamber 6a is a battery part 6a of a heat pump 6.

The battery part 6a comprises a battery device 7 to extract the inherent energy in the exhaust air mainly utilizing the difference in temperature between the warm exhaust air and the cooler refrigerant inside the battery and/or a second battery device 8 to extract the inherent energy in the exhaust air mainly utilizing the power of condensation which is forced to take place on the chilled surface of the battery device 8. The battery part 6a is thus configured to extract the energy from the passing air.

The humidity of the passing air will condensate inside the condensation chamber 6a, such as on the surface of the battery 8, and the resulting condensation water will be collected and led to a condensation tank 12 through a piping system 11.

In one embodiment, the ventilation system 1 is arranged to utilize the battery part of a heat pump as a condensation chamber 6a, possibly in addition to as in the embodiment above, by collecting the condensation water provided by the battery part 6a of the heat pump 6. As is known, during operation a battery part 6a will generate condensation when heating the air to be circulated. This condensation water may be collected in the condensation tank 12 and be used to sprinkle the ventilation system 1.

In one embodiment, the ventilation system 1 is arranged o utilize the triple action filter 100 as a condensation chamber. This may be used in combination with using the battery part of a heat pump as a condensation chamber, the system then having multiple condensation chambers.

In one embodiment the condensation chamber 6a is a chamber arranged in an air duct 5, 17—or possibly the air duct itself—that is kept at a temperature lower than the passing air, such as for example by placing the condensation chamber 6a in a cool room or outside.

The condensation tank 12 is arranged with a heating element 13 that is arranged to heat the condensation water to a temperature above 65 degrees Celsius (65° C.).

The condensation water is pumped by a pump 14 through a conduit 15 to a sprinkling system 16. The sprinkling system 16 is arranged with nozzles 16a, that are dimensioned and arranged to sprinkle the heated condensation water inside the filtration unit 3, and possibly also with nozzles 16b inside the filters 4, possibly being centrifugal separation filters 4 or triple action filters 100.

In one embodiment, the sprinkling system 16 is arranged with at least one nozzle 16c that is dimensioned and arranged to sprinkle the heated condensation water inside the condensation chamber 6a from a position above the battery device 7 and/or from a position above the battery device 8.

In one embodiment, the sprinkling system 16 is arranged with at least one nozzle 16d, 16e that is dimensioned and arranged to sprinkle the heated condensation water inside the first air duct 2 and/or second air duct 5 and/or any subsequent air ducts 17.

In one embodiment, at least some of the sprinkle nozzles 16a -e are arranged to sprinkle the water at 360 degrees. The nozzles 16a-e may be arranged to do so by rotating or by being 360 degree nozzles. In one embodiment, the 360 degrees are taken to be an effective 360 degrees at a distance offset from (below) the actual nozzle 16a-e, such as in a cone-like, spherical, or semi-spherical shape. In one embodiment the sprinkle nozzles 16b that are arranged to sprinkle inside the filter(s) 4 are arranged to sprinkle in 360 degrees. In one embodiment the sprinkle nozzles 16a that are arranged to sprinkle inside the filtration unit 3 are arranged to sprinkle in 360 degrees. In one embodiment the sprinkle nozzles 16c that are arranged to sprinkle inside the condensation chamber 6a are arranged to sprinkle in 360 degrees. In one embodiment the sprinkle nozzles 16d, 16e that are arranged to sprinkle inside the air ducts 2, 5, 17 are arranged to sprinkle in 360 degrees.

As the condensation is collected from the kitchen air, there is no need for an external water source to be connected to the system and the ventilation system becomes self-sufficient when it comes to cleaning the filter, and possibly also the air duct(s) and/or the condensation chamber.

Naturally the amount of condensation water needed depends on the size of the filtration unit 3, the number of filters 4, the length and width of the air duct(s) and the size of the condensation chamber. For cleaning a medium sized filtration unit 3 (having two filters 4) only 10 litres of heated water is needed.

Tests have shown that a 10 L condensation tank 12 fills up in 3 hours in a medium sized kitchen. The ventilation system 1 is thus ready for possibly a self-clean every third hour.

To clean also the air ducts, a larger condensation tank 12 may be needed. However, in one embodiment, the ventilation system 1 is arranged to perform a cleaning cycle where one or more components of the ventilation system 1 is cleaned at each cleaning session forming the cycle, which cycle is repeated.

In one embodiment, the pump 14 together with all the nozzles 16a -e are dimensioned and arranged to pump and sprinkle the heated condensation water in a laminar flow. By having a laminar flow, the sprinklers 16a-e work more effectively, as the condensation water will be delivered in a constant flow of water droplets that is sprinkled in an even flow covering a substantial portion of the surface to be cleaned. The laminar flow is achieved by configuring the pump to only pump the condensation water without introducing any air (or other gas) bubbles. This is achieved by configuring the pump with respect to power, the various pipes and conduits and the shape of the sprinkle nozzle/hole. As a skilled person would understand this may be achieved in a variety of manners all dependent on the chosen design of the sprinkler system. The laminar flow provides for the condensation water to maintain its temperature and also provides for a more even cleaning solving of the grease to be cleaned away. Thus, this allows the water to remain above 65 degrees when it hits the surface it is supposed to clean, which is beneficial to the process of cleaning the surface from grease as water above 65 degrees forms an emulsion with grease and allows for the grease to be easily rinsed off the surface.

In one embodiment, the sprinkle nozzle(s) 16b in the filters 4, such as the centrifugal separator filters 4 or the triple action filter 100, is arranged to sprinkle the water at 360 degrees. The laminar water flow will be sprinkled from the center of the centrifugal separator filter 4 and subsequently thrown by the centrifugal force, out through the filters. In arranging the sprinkling in this manner, the water will thus be distributed in the same pattern as the grease particles as they are flung from the centrifugal separator filters while the air cleaner is in operation. The heated water is thus delivered onto the surfaces that require cleaning, in the same pattern as the grease particles are spattered, ensuring that the water ends up in the areas where the grease particles are spattered, which provides for a more efficient cleaning.

To facilitate the water droplets mimicking the splatter pattern of the grease particles' trajectory the fan 9 may be turned off during the cleaning.

The cleaning is thus effected by turning off the fan 9, engaging the pump 14 to pump the heated condensation water through the sprinkler system 16 to the various sprinklers 16a-e. In one embodiment the whole ventilation system 1 is cleaned at the same time. In one embodiment parts of the ventilation system is cleaned at different times, cleaning one or more parts at one cleaning session, and other parts at another(/other) cleaning session(s). For example, the filtration unit 3 may be cleaned in one session and the first air duct 2 may be cleaned at another session. This allows for a small tank to be used even for a large ventilation system 1, thereby reducing the space needed. As the second air duct 5 and the condensation chamber 6a is only subjected to filtered air, they do not require as frequent cleaning as the first air duct 2 and the filtration unit 3—if any. They could however, also be cleaned at a same or another cleaning session.

The temperature that the condensation water needs to be heated to depends on the outlay and design of the ventilation system, and, as a skilled person would understand and know how to calculate after having read the contents of this application, the condensation water needs to engage the grease particles to be cleaned away having a temperature above 65 degrees Celsius, the temperature at which grease forms an emulsion with the cleaning water, which emulsion may be led away through waste ducts.

As the ventilation system needs to be sprinkled often enough to avoid that the grease dries out and therefore changes its chemical structure to no longer be susceptive to form an emulsion with water warmer than 65 degrees, the ventilation system according to herein may beneficially be used as the condensation water builds up over a short period (2-4 hours) and thus frequent cleaning is possible at no or little added cost and may be performed automatically. The cleaning is also highly environmentally friendly as no additional water is used and the heating of the water is achieved through the heat pump—whose hot gas needs to be cooled anyway—which also alleviates the need for cleaning liquids. The system thus thereby recycles water and energy in a clever manner, and the cleaning is performed without increasing cost.

The ventilation system according to herein is thus arranged to (possibly) automatically clean itself without using additional water from the building's water supply. The ventilation system 1 according to herein is thus easy to install (no additional water connections are needed), environmentally friendly (as it does not require additional water) and will reduce the need for manually cleaning the ventilation system to abide by any local, national or regional restrictions.

In the embodiment where the condensation chamber 6*a* is comprised in a battery part of a heat pump 6, the ventilation system 1 recycles some of the energy that would otherwise be lost through the exhaust air that is led away by the ventilation system. The ventilation system is thus also environmentally friendly.

Furthermore, the inventors have realized that by utilizing the hot gas generated in the pump part 6*b* of the heat pump 6 as the heating element 13, which gas is usually around 80-90 degrees Celsius, by diverging the hot gas in a duct through a heat exchanger (possibly in the form of a spiraled pipe) heating the condensation water in the condensation tank 12, the hot gas will cool off more quickly and the heat pump's operation becomes even more efficient. Such a ventilation system 1 is thus even more environmentally friendly in that it increases the efficiency of any heat pump 6 connected to it.

According to one aspect of the teachings herein there is provided a filtration unit 3 and/or a filter 4,100 that is arranged with or arranged to receive a sprinkler system 16 for automatic cleaning according to the teachings herein.

According to one aspect of the teachings herein there is provided a condensation chamber 6*a* that is arranged to collect condensation in a condensation tank 12, for heating the condensation water to above 65 degrees Celsius for distributing the heated condensation water through a sprinkler system 16. In one embodiment the condensation chamber is a battery part of a heat pump 6.

According to one aspect of the teachings herein there is provided a sprinkler system 16 arranged to receive heated water, possibly through heating received condensation water in a condensation tank utilizing a heating element 13, which water is to be sprinkled in a filtration unit 3, a filter 4,100, a condensation chamber 6*a* and/or one or more air ducts 2, 5 and 17.

According to one aspect of the teachings herein there is provided a battery part 6*a* arranged to extract the energy inherent in temperature and/or the condensation process of humidity in the exhaust air. In one embodiment, the battery part 6*a* is also arranged to operate as a condensation chamber for collecting condensation water in a condensation tank in which the condensation water is collected and heated for later cleaning of a ventilation system.

According to one aspect of the teachings herein there is provided a heat pump 6 having a battery part 6*a* that is arranged to act as a condensation chamber and is connected to a condensation chamber 12 in which the condensation water is collected and heated by a hot gas (or vapor) conduit 13 being comprised in the heat pump 6 for later cleaning of a ventilation system.

The heat pump 6 may be used to heat and/or cool another area than the kitchen. The system is thus further beneficial and environmentally friendly in that it recycles the heat escaping the kitchen to other areas.

Figure 4:
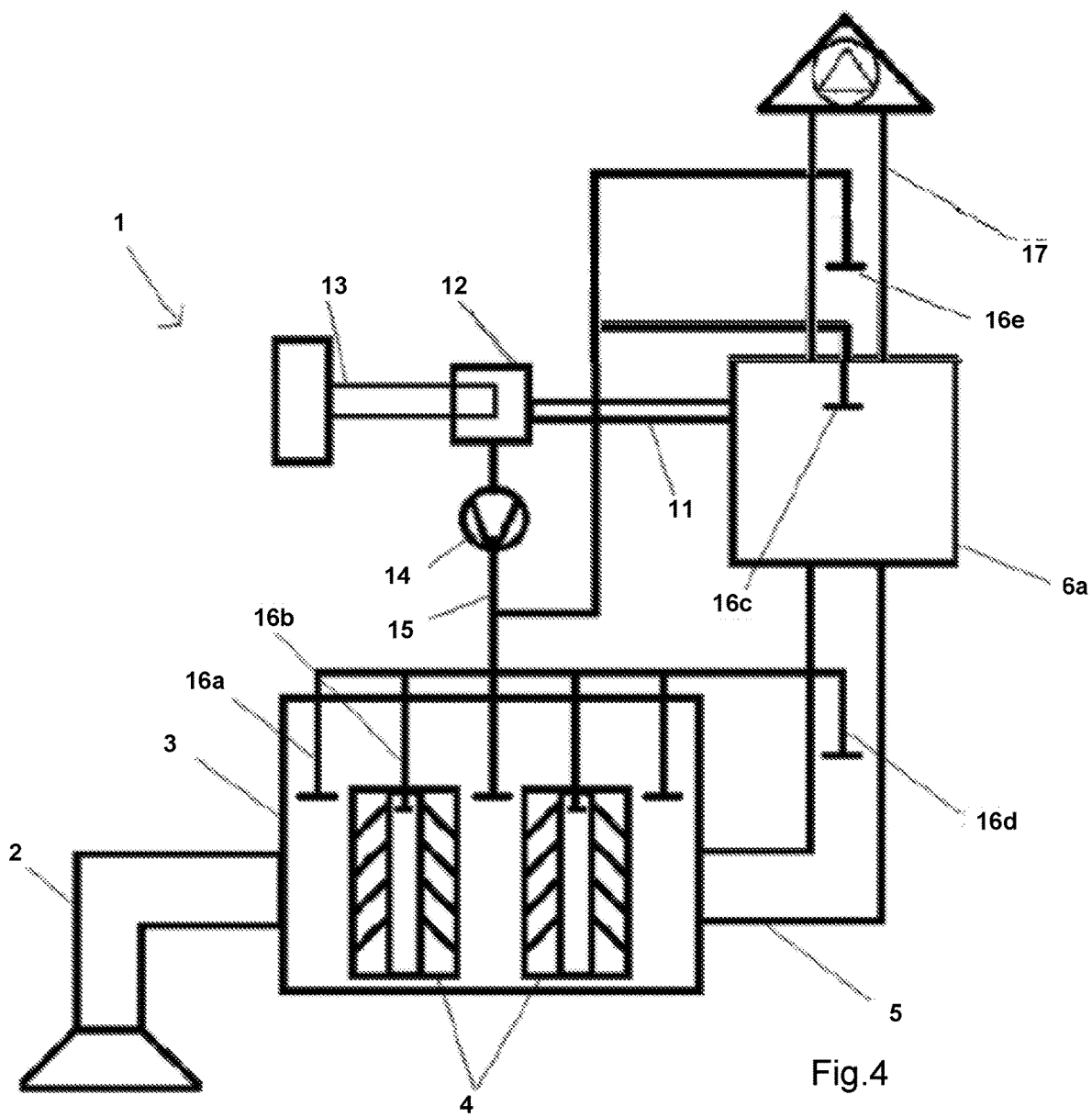
FIG. 4 shows a schematic overview of a ventilation system 1 arranged for self- cleaning using condensation water retrieved from the ventilated air according to one embodiment of the teachings herein.

According to one aspect of the teachings herein there is provided an arrangement and a method for providing a cleaning of a ventilation system by using condensation water. FIG. 4 shows a schematic overview of a ventilation system 1 arranged for self-cleaning using condensation water retrieved from the ventilated air.

The ventilation system 1 comprises a canopy connected to a first air duct 2 through which the kitchen air is led to a filtration unit 3 that may comprise one or more filters 4. The filtered air is led through a second air duct 5 to a condensation chamber 6*a*.

Some part of the humidity in the passing air will condensate inside the condensation chamber 6*a* and the resulting condensation water is led to a condensation tank 12 possibly through a piping system 11.

The condensation tank 12 is arranged with a heating element 13 that is arranged to heat the condensation water to a temperature above 65 degrees Celsius (65 C). In one embodiment, as was disclosed with reference to FIG. 1 and will be disclosed with reference to FIG. 6, the heating element is effected through the use of a hot gas conduit of a heat pump.

The condensation water may then be pumped by a pump 14 through a conduit 15 to a sprinkling system 16. The sprinkling system 16 is arranged with nozzles 16*a*, 16*b* that are dimensioned and arranged to sprinkle the heated condensation water inside the filtration unit 3, and possibly also inside the filters 4. In one embodiment, the sprinkling system 16 is arranged with at least one nozzle 16*c* that is dimensioned and arranged to sprinkle the heated condensation water inside the condensation chamber 6*a*.

In one embodiment, the sprinkling system 16 is arranged with at least one nozzle 16*d*, 16*e* that is dimensioned and arranged to sprinkle the heated condensation water inside the first air duct 2 and/or second air duct 5 and/or subsequent air ducts 17. In one embodiment, at least some of the sprinkle nozzles 16*a-e* are arranged to sprinkle the water at 360 degrees.

The sprinkler system 16 may be a sprinkler system as disclosed below with reference to FIG. 8.

As the condensation water is collected from the humidity in the kitchen exhaust air, there is no need for an external water source to be connected to the system and the ventilation system becomes self-sufficient when it comes to cleaning the filter, and possibly also the air duct(s) and/or the condensation chamber.

The ventilation system according to herein is thus arranged to (possibly) automatically clean itself without using additional water. The ventilation system 1 according to herein is thus easy to install (no additional water connections are needed), environmentally friendly (as it does not require additional water, nor does it require any chemicals) and will reduce the need for manually cleaning the ventilation system to abide by any local, national or regional restrictions.

It should be noted that any variants or alternatives disclosed for the general ventilation system in the above with reference to FIGS. 1 (and 2 and 3) may also be applied to the ventilation system 1 disclosed with reference to FIG. 4.

Figure 5:
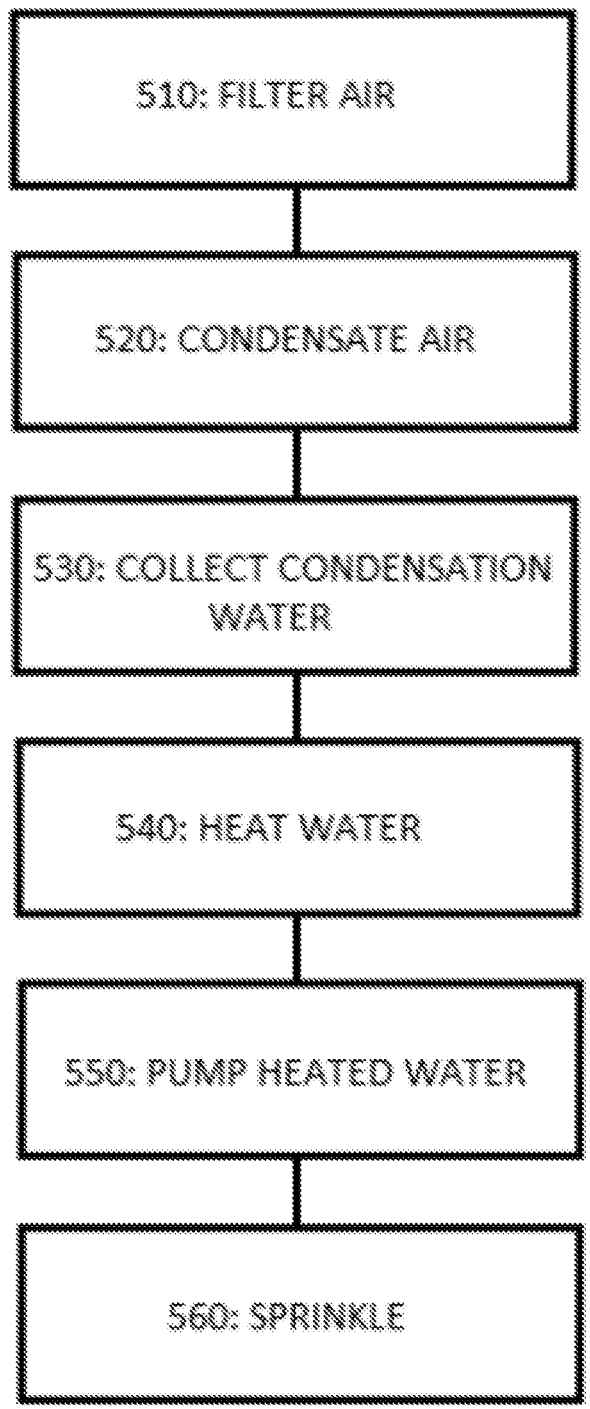
FIG. 5 shows a flowchart for a general method to be used with a self-cleaning arrangement as in FIG. 4 according to one embodiment of the teachings herein.

FIG. 5 shows a flowchart for a general method to be used with a self-cleaning arrangement such as disclosed above. Air is led via air ducts through a filter 510 and then through a condensation chamber where humidity in the filtered air condensates 520 and is collected 530 in a condensation water tank. The condensation water is heated 540 and then pumped 550 through a sprinkler system to sprinkle 560, the inside of the filter the condensation chamber and/or the air ducts.

This aspect provides for a self-cleaning ventilation system that does not need an external water source.

Figure 6:
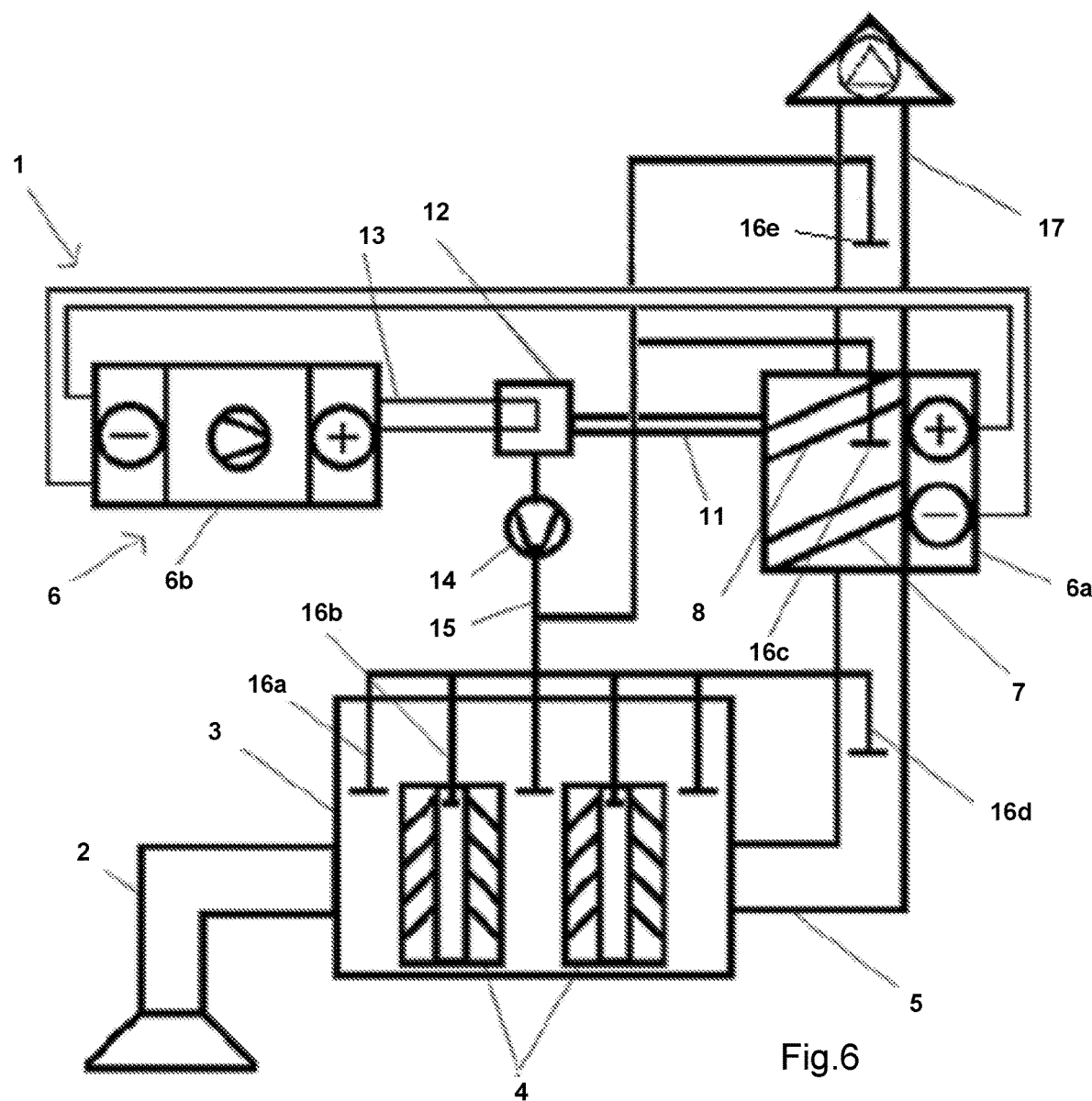
FIG. 6 shows a schematic overview of a ventilation system 1 arranged for cleaning of a ventilation system by using condensation water, wherein the condensation water is heated by the hot gas conduit of a heat pump according to one embodiment of the teachings herein.

According to one aspect of the teachings herein there is provided an arrangement and a method for providing a cleaning of a ventilation system by using condensation water, wherein the condensation water is heated by the hot gas conduit of a heat pump. FIG. 6 shows a schematic overview of a ventilation system 1 arranged for such self-cleaning.

The ventilation system 1 comprises a canopy connected to a first air duct 2 through which the kitchen air is led to a filtration unit 3. The filtration unit 3 may comprise one or more filters 4. The filtered air is led through a second air duct 5 to a battery part 6a of a heat pump 6. The battery part 6a comprises a battery device 7 to extract the inherent energy in the exhaust air mainly utilizing the difference in temperature between the warm exhaust air and the cooler refrigerant inside the battery and/or a second battery device 8 to extract the inherent energy in the exhaust air mainly utilizing the power of condensation which is forced to take place on the chilled surface of the device. The battery part 6a may thus extract the energy from the passing air.

The humidity of the passing air will condensate inside the battery part 6a and the resulting condensation water is led to a condensation tank 12 through a piping system 11.

In one embodiment, another or alternative condensation chamber 6a may be used to collect the condensation water, such as in the ventilation system disclosed with reference to FIG. 4.

The hot gas conduit 13 of the heat pump part 6b of the heat pump 6 is arranged to act as a heating element. As the hot gas usually has a temperature in the range of around 80-90 degrees Celsius, the hot gas may be diverged through a duct acting as a heat exchanger (possibly in the form of a spiraled pipe) heating the condensation water in the condensation tank 12 to a temperature above 65 degrees Celsius (65 C). This will enable the hot gas to cool off more quickly and the heat pump's operation becomes even more efficient. Such a ventilation system 1 is thus even more environmentally friendly in that it increases the efficiency of any heat pump 6 connected to it.

The length and shape of the duct leading the hot gas depends on the size of the condensation water tank 12 and the temperature to be reached, as would be apparent to a skilled person after having read the contents of this application.

The temperature that the condensation water needs to be heated to depends on the outlay and design of the ventilation system, and, as a skilled person would understand and know how to calculate after having read the contents of this application, the condensation water needs to engage the grease particles to be cleaned away having a temperature above 65 degrees Celsius, the temperature at which grease forms an emulsion with the cleaning water, which emulsion may be led away through waste ducts.

The condensation water is pumped by a pump 14 through a conduit 15 to a sprinkling system 16. The sprinkling system 16 is arranged with nozzles 16a that are dimensioned and arranged to sprinkle the heated condensation water inside the filtration unit 3, and possibly also with nozzles 16b inside the filters 4. In one embodiment, the sprinkling system 16 is arranged with at least one nozzle 16c that is dimensioned and arranged to sprinkle the heated condensation water inside the battery part 6a. In one embodiment, the sprinkling system 16 is arranged with at least one nozzle 16d, 16e that is dimensioned and arranged to sprinkle the heated condensation water inside the first air duct 2 and/or second air duct 5 and/or subsequent air ducts 17. In one embodiment, at least some of the sprinkle nozzles 16a-e are arranged to sprinkle the water at 360 degrees.

The sprinkler system 16 may be a sprinkler system as disclosed below with reference to FIG. 8.

As the condensation water is heated by the heat pump's hot gas, the efficiency of the heat pump is thereby increased making the ventilation system 1 even more environmentally friendly in that it recycles the energy from the filtered air to increase the efficiency of the heat pump.

In one embodiment the ventilation system of FIG. 4 and the ventilation system of FIG. 6 are combined using the battery part 6a as the condensation chamber 6a.

It should be noted that any variants or alternatives disclosed for the general ventilation system in the above with reference to FIGS. 1 and 4 (and 2 and 3) may also be applied to the ventilation system 1 disclosed with reference to FIG. 6.

Figure 7:
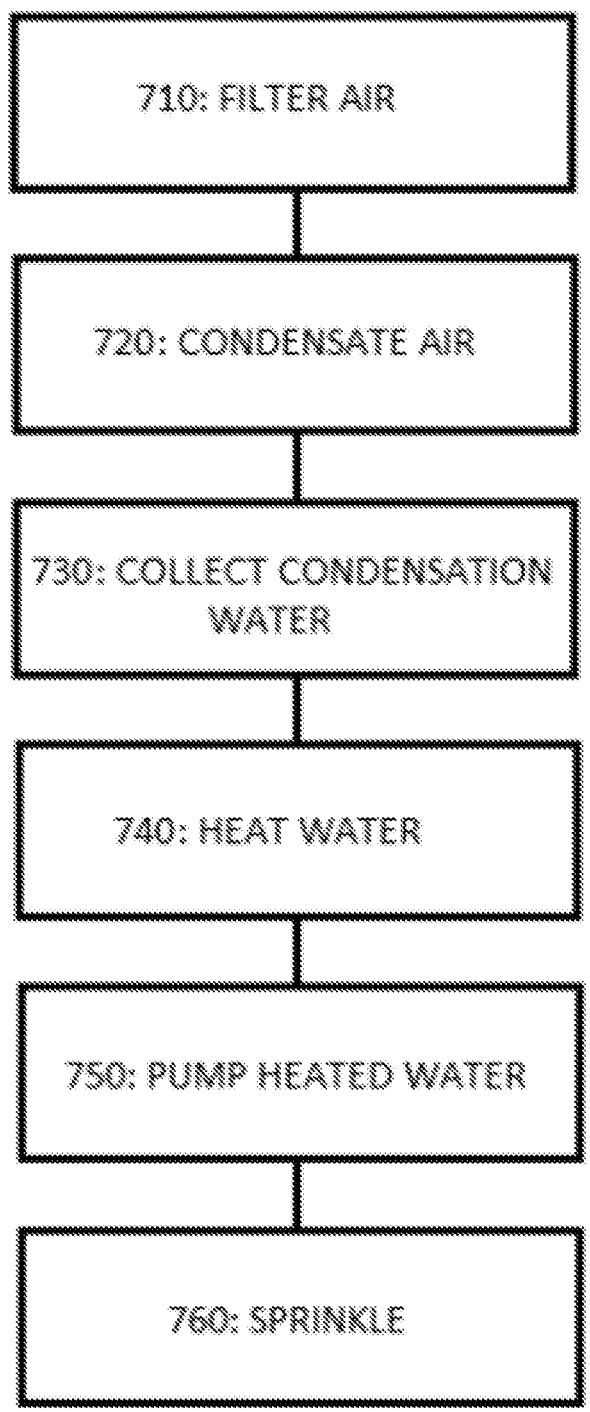
FIG. 7 shows a flowchart for a general method to be used with a self-cleaning arrangement as in FIG. 6 according to one embodiment of the teachings herein.

FIG. 7 shows a flowchart for a general method to be used with a self-cleaning arrangement such as disclosed above. Air is led via air ducts through a filter 710 and then through a condensation chamber where humidity in the filtered air condensates 720 and is collected 730 in a condensation water tank. The condensation water is heated 740 by the hot gas conduit of a heat pump and then pumped 750 through a sprinkler system to sprinkle 760 the inside of the filter, the condensation chamber and/or the air ducts.

This aspect provides for a ventilation system that increases the efficiency of a heat pump.

According to one aspect of the teachings herein there is provided an arrangement and a method for providing a cleaning of a ventilation system by using condensation water. FIG. 8 shows a schematic overview of a sprinkler system 16 arranged for self-cleaning of a ventilation system 1 using condensation water retrieved from the ventilated air.

The ventilation system 1 comprises a canopy connected to a first air duct 2 through which kitchen air is led to a filtration unit 3 that may comprise one or more filters 4. The filtered air is led through a second air duct 5 to a condensation chamber 6a.

In one embodiment the condensation chamber 6a is a battery part 6a of a heat pump 6, as is disclosed above with reference to FIGS. 1 and 6, and also with reference to FIG. 4.

The humidity of the passing air condensates inside the condensation chamber 6a and the resulting condensation water is led to a condensation tank 12 through a piping system 11.

The condensation tank 12 is arranged with a heating element 13 that is arranged to heat the condensation water to a temperature above 65 degrees Celsius (65 C). In one embodiment the heating element 13 is a hot gas conduit of a heat pump 6, as is disclosed above with reference to FIGS. 1 and 6, and also with reference to FIG. 4.

The condensation water is pumped by a pump 14 through a conduit 15 to the sprinkling system 16. In one embodiment, the condensation tank 12, the heating element 13 and/or the pump 14 are comprised in the ventilation system.

The sprinkling system 16 is thus arranged to receive the condensation water (possibly already heated) and to deliver it through a sprinkler conduit 15 to sprinkler nozzles 16a-e. The sprinkler conduit 15 may be formed as a hose and/or a pipe or a combination of such. The sprinkler nozzles 16a-e may be formed as separate nozzle or series of nozzles attached to the conduit 15 or as a hole or opening or series of holes and/or openings in the conduit 15. In one embodiment, some sprinkler nozzles 16*a-e* are formed by separate nozzles being attached to the conduit, and some sprinkler nozzles 16*a-e* are formed by holes or openings in the conduit 15.

At least some of the sprinkler nozzles 16*a*, 16*b* are dimensioned and arranged to sprinkle the heated condensation water inside the filtration unit 3, and possibly also inside the filters 4. These nozzles may be formed by separate nozzles attached to the conduit 15.These nozzles 16*a*, 16*b* may alternatively (or additionally in the case of more than one such nozzle 16*c*) be formed by a hole (or opening) or series of holes (or openings) in the conduit 15. In one embodiment, the sprinkler nozzle(s) 16*a* arranged to sprinkle in the filtration unit 3 is formed by a hole (or opening) or a series of holes (or openings) formed in the conduit and the sprinkler nozzle(s) 16*b* arranged to sprinkle inside the filter(s) 4 is formed by a separate nozzle attached to the conduit 15. Combinations of holes and attached nozzles are of course also possible depending on the design of the filtration unit 3 and the filter(s) 4.

In one embodiment, the sprinkling system 16 is arranged with at least one nozzle 16*c* that is dimensioned and arranged to sprinkle the heated condensation water inside the condensation chamber 6*a*. This nozzle 16*c* may be formed by a separate nozzle attached to the conduit 15. This nozzle 16*c* may alternatively (or additionally in the case of more than one such nozzle 16*c*) be formed by a hole (or opening) or series of holes (or openings) in the conduit 15. Combinations of holes and attached nozzles are of course also possible depending on the design of the condensation chamber 6*a*.

In one embodiment, the sprinkling system 16 is arranged with at least one nozzle 16*d*, 16*e* that is dimensioned and arranged to sprinkle the heated condensation water inside the first air duct 2 and/or second air duct 5 and/or any subsequent air ducts 17. This nozzle 16*d*, 16*e* may be formed by a separate nozzle attached to the conduit 15. This nozzle 16*c* may alternatively (or additionally in the case of more than one such nozzle 16*c*) be formed by a hole (or opening) or series of holes (or openings) in the conduit 15. Combinations of holes and attached nozzles are of course also possible depending on the design of the condensation chamber 6*a*.

In one embodiment, at least some of the sprinkle nozzles 16*a-e* are arranged to sprinkle the water at 360 degrees. The nozzles 16*a-e* may be arranged to do so by rotating or by being 360 degree nozzles. In one embodiment, the 360 degrees are taken to be an effective 360 degrees at a distance offset from (below) the actual nozzle 16*a-e*. In one embodiment the sprinkle nozzles 16*b* that are arranged to sprinkle inside the filter(s) 4 are arranged to sprinkle in 360 degrees. In one embodiment the sprinkle nozzles 16*a* that are arranged to sprinkle inside the filtration unit 3 are arranged to sprinkle in 360 degrees. In one embodiment the sprinkle nozzles 16*c* that are arranged to sprinkle inside the condensation chamber 6*a* are arranged to sprinkle in 360 degrees. In one embodiment the sprinkle nozzles 16*d*, 16*e* that are arranged to sprinkle inside the air ducts 2, 5 and 17 are arranged to sprinkle in 360 degrees.

Using the attached nozzles allows for a more accurately directed sprinkling, whereas using holes (or openings) in the conduit allows for a cheaper installation that is also easier to service.

In one embodiment, a series of holes (or openings) is used to sprinkle larger areas, such as the ventilation ducts, and attached nozzles are used to sprinkle inside the filters 4.

Naturally the amount of condensation water needed depends on the size of the filtration unit 3, the number of filters 4, the length and width of the air duct(s) and the size of the condensation chamber. For cleaning a medium sized filtration unit 3 (having two filters 4) only 10 litres of heated water is needed.

Tests have shown that a 10 L condensation tank 12 fills up in 2 hours in a medium sized kitchen. The ventilation system 1 is thus ready for possibly a self clean every second hour.

To clean also the air ducts, a larger condensation tank 12 may be needed, for example 100 litres. However, in one embodiment, the ventilation system 1 is arranged to perform a cleaning cycle where one or more components of the ventilation system 1 is cleaned at each cleaning session forming the cycle, which cycle is repeated.

In one embodiment, the sprinkle nozzles 16*b* in the centrifugal separator filters 4, are arranged to sprinkle the water at 360 degrees. The laminar water flow will then be spread from the center of the centrifugal separator filter 4 and subsequently thrown by the centrifugal force, out through the filters. In doing so, the water will thus be distributed in the same pattern as the grease particles as they are flung from the centrifugal separator filters while the air cleaner is in operation. The heated water is thus delivered onto the surfaces that require cleaning, in the same spatter pattern as the grease particles are spattered, ensuring that the water ends up in the areas where the grease particles are spattered, which provides for a more efficient cleaning 16*a-e* as has been disclosed above with reference to FIGS. 2 and 3.

The temperature that the condensation water needs to be heated to depends on the outlay and design of the ventilation system, and, as a skilled person would understand and know how to calculate after having read the contents of this application, the condensation water needs to engage the grease particles to be cleaned away having a temperature above 65 degrees Celsius, the temperature at which grease forms an emulsion with the cleaning water, which emulsion may be led away through waste ducts.

A sprinkler system 16 as disclosed herein, may beneficially be fitted in a ventilation system 1 as those disclosed above with reference to FIGS. 1, 4 and 6.

Figure 8:
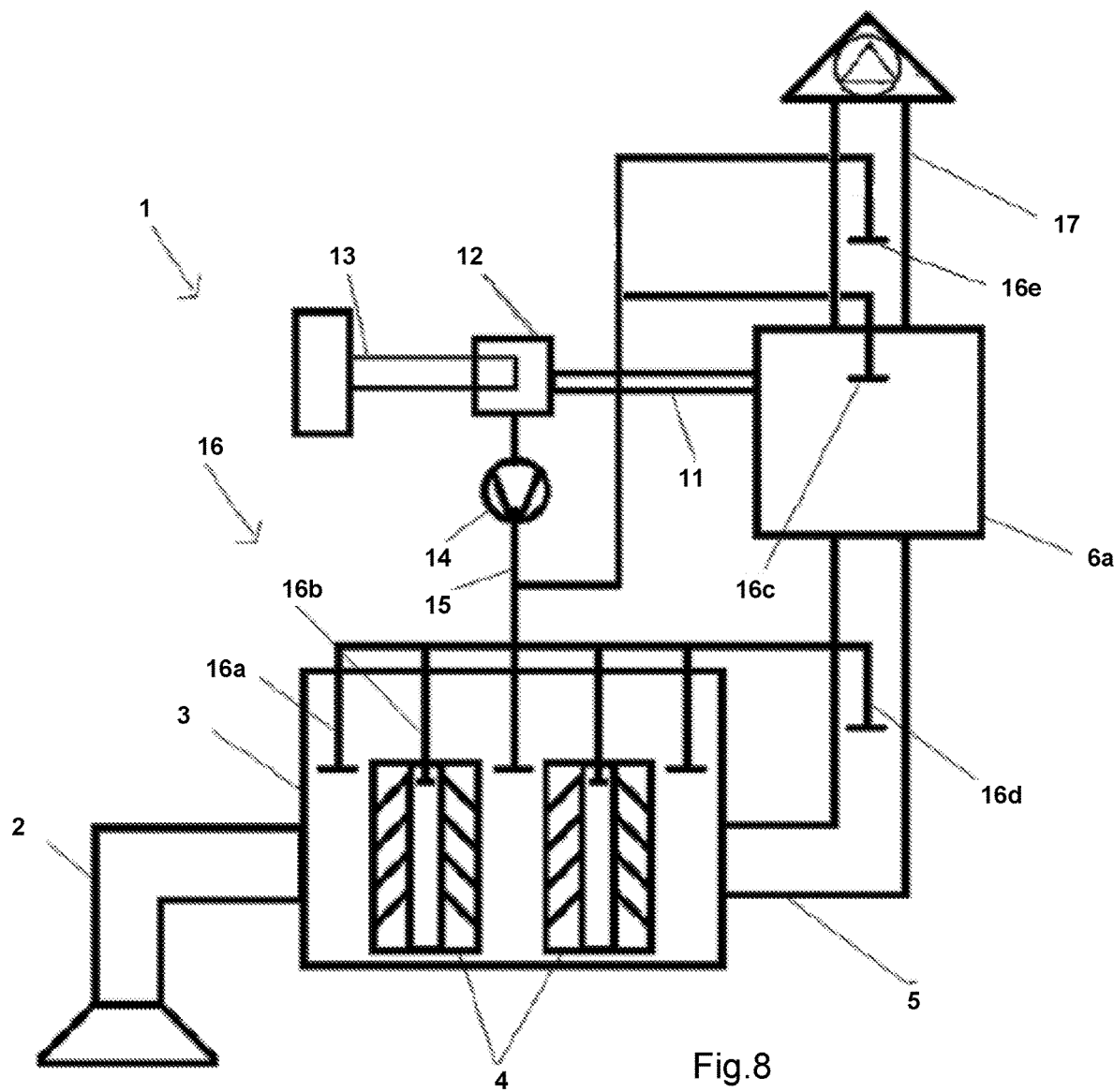
FIG. 8 shows a schematic overview of a sprinkler system 16 arranged for self- cleaning of a ventilation system 1 using condensation water retrieved from the ventilated air according to one embodiment of the teachings herein.

It should be noted that any variants or alternatives disclosed for the general ventilation system in the above with reference to FIGS. 1, 4 and 6 (and 2 and 3) may also be applied to the sprinkler system 16 disclosed with reference to FIG. 8.

Figure 9:
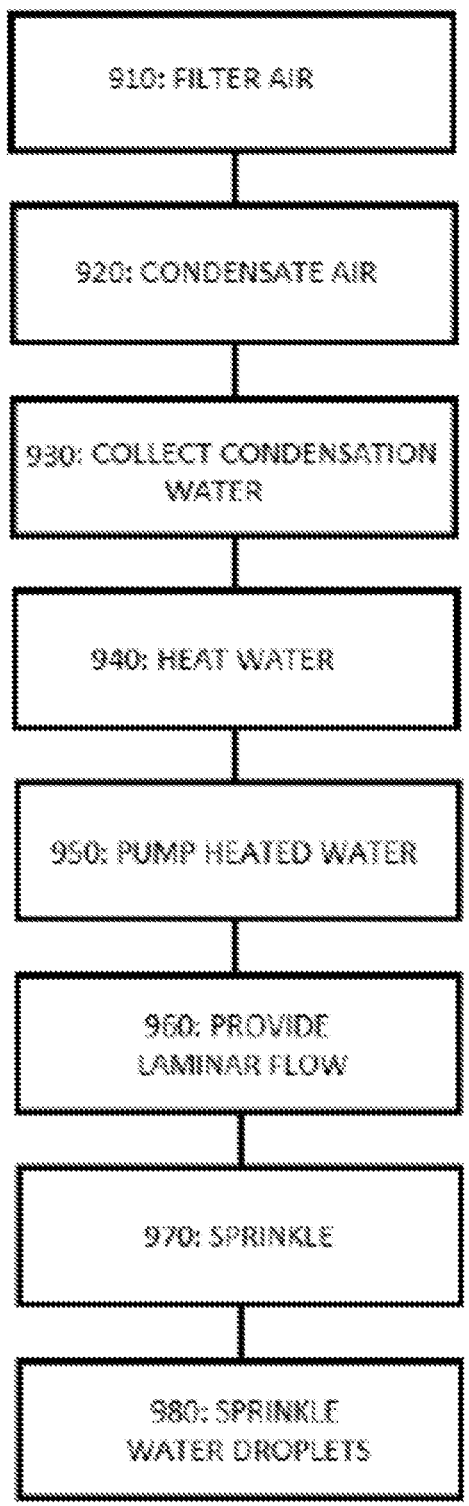
FIG. 9 shows a flowchart for a general method to be used with a self-cleaning arrangement as in FIG. 8 according to one embodiment of the teachings herein.

FIG. 9 shows a flowchart for a general method to be used with a self-cleaning arrangement such as disclosed above. Air is led via air ducts through a filter 910 and then through a condensation chamber where humidity in the filtered air condensates 920 and is collected 930 in a condensation water tank. The condensation water is heated 940 and then pumped 950 through a sprinkler system. The sprinkler system has thereby received the condensation water. The water is pumped through the sprinkler system 16 to sprinkle 970 the inside of the filter, the condensation chamber and/or the air ducts. The pump being arranged to provide 960 the water in a laminar flow (without air bubbles) and wherein the sprinkling system is arranged to provide or sprinkle 980 the water in the form of water droplets in a laminar flow, at least in the filter(s) 4.

This aspect provides for a sprinkler system for use in a ventilation system that allows for cleaning with condensation water and for providing an efficient cleaning by delivering the heated condensation water to where the grease particles have a tendency to build up/collect.

Figure 10:
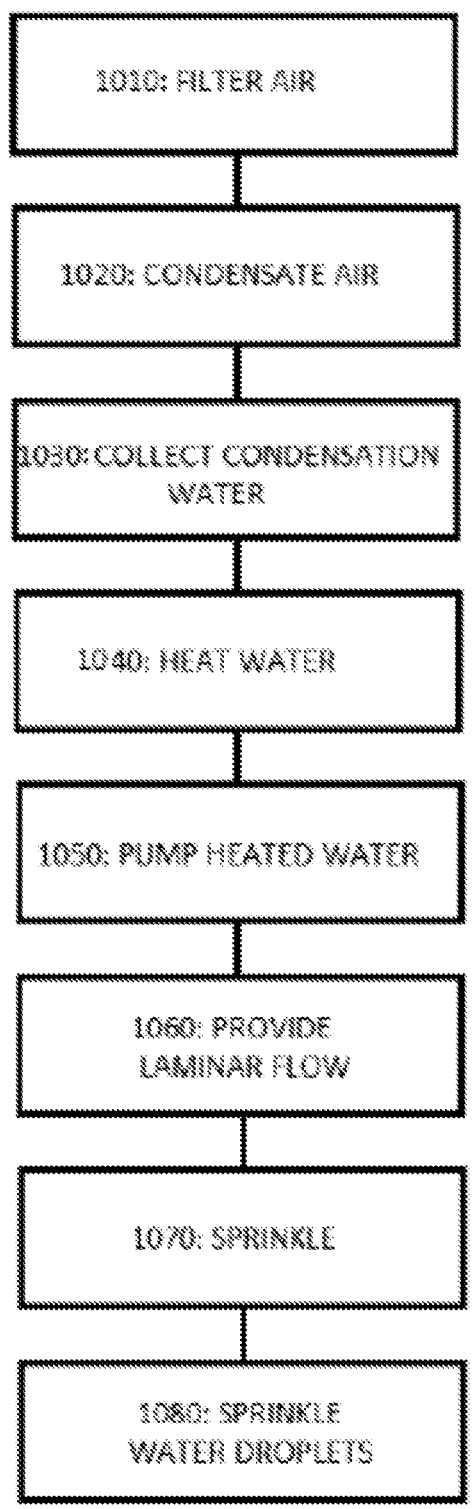
FIG. 10 shows a flowchart for a general method to be used with a self-cleaning arrangement as in FIGS. 1, 4, 6 and 8 according to one embodiment of the teachings herein.

FIG. 10 shows a flowchart for a general method to be used with a self-cleaning arrangement such as disclosed above, especially the ventilation system 1 of FIG. 1. Air is led via air ducts through a filter 1010 where the air is filtered to only contain grease particles of a size less than for example 1.4 micro meters. The filtered air is led through a condensation chamber, being a battery part of a heat pump where humidity in the filtered air condensates 1020 and is collected 1030 in a condensation water tank. The condensation water is heated 1040 by the hot gas of a heat pump to above 65 degrees Celsius and then pumped 1050 through a sprinkler system to sprinkle 1070 the inside of the filter, the condensation chamber and/or the air ducts. The pump being arranged to provide 1060 the water in a laminar flow (without air bubbles) and wherein the sprinkling system is arranged to provide or sprinkle 1080 the water in the form of water droplets in a laminar flow, at least in the filter(s) 4.

Now turning to FIGS. 11A, 11B, 11C and 12 a new filter 100 will be disclosed. The filter 100 may be used as a filter in the filtration unit 3 of the ventilation system 1 disclosed above. The filter 100 may also be used as a standalone filter or a filter in another ventilation system and its use is not limited to filtering kitchen exhaust air.

FIGS. 11A, 11B and 11C each shows a schematic side view of a filter according to one embodiment of the teachings herein. FIG. 11A shows a front view of the filter 100, the filter 100 having a top portion 101 and a bottom portion 102. It should be noted that even though the names top portion and bottom portion implies a positional relationship, they should be understood to merely be opposing portions, and the arrangement with a top and bottom portion is merely for illustrative purposes. However, in an embodiment where condensation is collected, the bottom portion need to be a portion positioned lower than the rest of the remaining filter arrangement. The front view of the filter shows a front face A of the filter 100. The front face is to be understood as an inlet face, i.e. the face where the air to be filtered enters the filter. A plurality of pipes 110, such as copper pipes, is arranged between the top portion 101, acting as a roof of the filter, and the bottom portion, acting as a floor of the filter.

FIG. 11B shows a side view B of the triple action filter 100 where the front face A faces to the left of the figure. As can be seen the pipes 110 are arranged in at least two rows. In FIGS. 11B, 11C and 12 the pipes are arranged in three rows, this is however only an exemplifying number, but which has been shown in tests to provide an adequate filtering effect without using an abundance of material. In FIGS. 11B, 11C and 12 the three rows are referenced 110A, 110B and 110C. The rows may be arranged at a distance d1 and d2 from each other respectively. The inter-row distances d1 and d2 may be the same, or they may differ. In one example they are 5 cm. In another example they are 10 cm. In another example they are 5 to 10 cm. The pipes may be arranged at a distance d3 from each other within a row. In one example this distance is 15 mm. In another example it is 50 mm.

FIG. 11C shows the triple action filter 100 from above, and is as such a schematic top view of the filter 100. As can be seen in FIG. 11C, the various rows of pipes 110A, 110B and 110C are arranged in an overlapping manner so that a straight path through the rows can not be taken. In this embodiment three rows are shown which has the benefit of blocking paths gong sideways through the filter. The distance between two pipes 110 in the same pipe row 110A, 110B and 110C should thus be smaller than or equal to the diameter of the pipes 110.

If the distance is larger than the diameter, care needs to be taken when arranging the pipes. For example, the rows may need to be arranged so that the pipes in a front row, such as row 110A are not immediately in front of the pipes in the third row, for example row 110C.

Also shown in FIGS. 11B and 11C (and also in FIG. 12), there are two groups of pipe rows. A first pipe group 120 and a second pipe group 130. It should be noted that even though the examples herein only show two groups, filters according to herein may be formed using any number of groups, such as only one group, two groups, three groups or more depending on the design and needs of the filter and also of a ventilation system using the filter. The distance D between two groups 120, 130 will be discussed more in detail with reference to FIG. 12, but exemplary distances are above 10 cm. In another example an example distance is 20 cm, 30 cm, 40 cm or 50 cm. In one example the distance is between 10 to 100 cm. In one example the distance is between 10 and 50 cm. It should be noted that the distance given may be a minimum distance as a longer distance will allow the particles 150$ii$ to clump together more effectively.

Other example measurements of one embodiment are
pipe length: 720 mm
pipe diameter: 6 mm
inter-row distance d1, d2: 50 mm
inter-pipe distance d3: 16 mm
inter-group distance D: 400 mm
filter length (face B): 800 mm
filter width (face A): 800 mm
number of pipes in each row: 48-49

All these measurements are only for exemplifying purposes, and it should be noted that many variations are possible, and depend on the intended purpose and placement of the filter 100.

It should be noted that the pipe diameter may differ from pipe row to pipe row 110A-F. It may also differ from pipe group 120 to pipe group 130.

The pipe length may also differ, especially if the filter 100 is adapted to be used with a ventilation system having a varying width/height/diameter.

It should be noted that the filter 100 may comprise more than one second pipe group 130, even if only one is shown in the figures, which may be positioned at a distance D from the first second pipe group 130. The further second pipe group 130 may also be positioned at a different distance D. The further second pipe group 130 may be arranged in a similar manner as the first second pipe group 130, or it may be arranged differently (different number of pipe rows, different inter-row distances, different diameters, etc).

In one embodiment the pipes 110 are joined inside or adjacent to the top portion 101 and also in or at the bottom portion 102 for being provided with a coolant. The pipe is thus arranged to transport the coolant and as the coolant travels through the pipe, the pipe 110 is cooled thereby providing a cooling effect to the air to be filtered. As the air to be filtered is cooled, moisture or condensation will form on the pipe. As the mass of the condensation grows on the pipe, the condensation will be drawn downwards by gravity and be collected in a collection chamber 140 arranged under the pipes 110. The condensation may then be drawn from the collection chamber 140 through an outlet 145, possibly to be used to sprinkle the ventilation system 1. In one embodiment, the collection chamber 145 only act to collect the condensation which is then (temporarily) stored in another collection chamber, not shown in FIGS. 11A, 11B or 11C, such as the condensation tank 12. In one embodiment, the collection chamber is simply the floor of the bottom portion, which may be arranged in a slanting fashion to ease the collection of the condensation through the outlet 145.

In one such embodiment, the pipe is provided with a smaller inner tube 115, hereafter called a capillary tube, for transporting the coolant. By utilizing a smaller tube inside the pipe, a greater cooling and also a greater collision surface (more on this later) is achieved with only a small amount of coolant.

Turning now to FIG. 12 the operation of the triple action filter 100 will be explained. Figure shows a schematic view of a filter and its functionality during operation according to one embodiment of the teachings herein. A flow of air or gas to be filtered, such as the exhaust air in a kitchen, is indicated by an arrow denoted F for Flow. The flow F enters the filter 100 through the front face A and encounters the first row 110A of pipes 110. Although the filter has a very simple design, it is ingenious in that it filters in at least three different and cooperating manners.

The three manners will be discussed by focusing on three different groups of fat particles 150 in the flow F.

The first manner of filtration is achieved through the overlapping arrangement of the pipes 110, whereby fat (or other) particles 150*i* simply collide with the various pipes blocking the path of the particle 150*i*. This is especially efficient for particles of a certain size that is too large to effectively travel between the pipes 110. Particles 150*ii* of a smaller size (the exact size being of course dependent on the diameter of the pipes and the distances between the pipes in each direction) may travel between the pipes, both due to its smaller size, but also due to turbulent flow in the flow F.

Such particles may be filtered in a subsequent group such as the second pipe group 130 should they escape the first pipe group 120. However, to increase the chances of such particles actually colliding in the second group, the inventor's have cleverly designed the filter to make use of the cooling of the air, which thus not only serves to extract the humidity from the flow.

As the particles travel close to a pipe 110, which pipe 110 is cooled by transporting a coolant, the particle 150*ii* is also cooled. The cooling effect of a pipe is indicated by a spotted circle denoted C around the pipes 110 in FIG. 12. As the particles are cooled by the pipes, they will be attracted to one another due to condensation and as they travel through the distance between the first and second pipe groups 120, 130 the particles are attracted to one another and thus travel towards each other, as they touch, they will clump together (fat particles bind strongly to other fat particles) and the size of the particle(s) will thus increase. As the smaller particles 150*ii* encounters the second pipe group 130 they will thus have grown to a larger size and the situation is the same as for the larger particles 150*i* when they encountered the first pipe group 120.

The distance D should thus be chosen so that enough time is given to the particles to travel to each other so that they can clump or bind together. The exact distance depends on many factors, such as the flow speed, the amount of cooling, the composition of the particles and so on. Experiments have shown that a distance providing sufficient results is around 300-500 mm.

The cooled particles 150*ii* will also be attracted to the cooled pipes 110 which increases the chances of a collision with a pipe thereby also increasing the likelihood that a particle is filtered.

A third manner of filtrating particles arises due do the round shape of the pipes 110. Even though round shapes add to the turbulence in a filter thus going against better judgment of hindering a laminar flow in a filter or ventilation system, the inventors have realized that the round shape also provides a small vacuum or at least area with lower pressure behind each pipe 110 in the direction of the flow F. Naturally other shapes are also possible for achieving a similar function, but the examples herein focus on a round shape, but it should be noted that other shapes such as elliptical, square, or oval and so on are also part of the teachings herein. The particle 150*iii* is shown to travel between some pipes to eventually be sucked in to the low pressure area LP or vacuum that forms behind a pipe (behind being taken to be relative the direction of the flow F). A low pressure region is a region having a lower pressure than the surrounding areas or volumes, that is a pressure that is (significantly) lower than that in the flow F. Also, due to the cooling effect, the likelihood of a particle being sucked into the vacuum increases as the cooled particle will then also be attracted to the cool pipe 110.

The three manners of filtration are thus distinct but also cooperative and enforcing each other.

FIG. 13 shows a flowchart for a general manner of filtering a gas using a filter 100 as disclosed herein. The filtration starts with arranging 1310 pipes in overlapping rows 110A, 110B, 110C. The pipes 110 may be cooled 1320. A flow F of gas to be filtered is provided 1330 and particles are filtered through collision 1340. The particles are also filtered by cooling the particles 1350, allowing the cooled particles to clump together 1351, by allowing them to travel a distance D, and subsequently colliding 1352 with pipes in a second pipe group 130. The particles are also filtered by the shape of the pipes 110 forming 1360 a low pressure region as the flow F passes the pipes 110 and the particles being sucked or drawn 1370 into those low pressure regions and thereby colliding with a pipe 110.

The clever, yet simple, arrangement thus provides a highly efficient filtering despite its very simple and elegant construction.

The invention claimed is:

1. A ventilation system configured to be self-cleaning, wherein said ventilation system comprises:
   a filtration unit configured to filter exhaust air led through it by at least one air duct;
   a condensation chamber configured to collect condensation water from the exhaust air; wherein the condensation chamber is comprised in a battery part of a heat pump, the battery part being configured to extract energy from the passing air;
   a heating element configured to heat the condensation water to a temperature equal to or above 65 degrees Celsius; and
   a sprinkler system configured to sprinkle the condensation water in one or more of the filtration unit, at least one of the at least one air duct, and/or the condensation chamber, wherein the ventilation system is thus configured to provide a self-cleaning of the ventilation system utilizing the condensation water;
   wherein the sprinkler system comprises at least one sprinkler nozzle for sprinkling the condensation water in the filtration unit; and
   wherein the filtration unit comprises at least one centrifugal separation filter, wherein the at least one sprinkler nozzle is arranged for sprinkling the condensation water inside the at least one centrifugal separation filter, wherein the condensation water will follow the same trajectories as grease particles within the exhaust air follow during filtration.

2. The ventilation system according to claim 1, wherein the heating element is a hot gas conduit of said heat pump.

3. The ventilation system according to claim 1 wherein at least one of the at least one centrifugal separation filter is run in a reverse mode during operation.

4. The ventilation system according to claim 1, wherein the condensation water is pumped in a flow without air bubbles through the sprinkler system.

5. The ventilation system according to claim 1, wherein the heat pump comprises a hot gas conduit, wherein the heat pump is configured to collect condensation water in the battery part and heat the collected condensation water utilizing the hot gas conduit, the heat pump thus acting as the condensation chamber and the heating element in the system.

6. The ventilation system according to claim 2, wherein the at least one sprinkler nozzle is formed as a plurality of separate nozzles and/or a series of nozzles attached to the conduit or as a hole or opening or series of holes and/or openings in the conduit.

7. The ventilation system according to claim 6, wherein at least some of the sprinkler nozzles are dimensioned and arranged to sprinkle the heated condensation water inside the filtration unit comprised in the ventilation system.

8. The ventilation system according to claim 6 wherein at least one nozzle is dimensioned and arranged to sprinkle the heated condensation water inside the condensation chamber; and/or wherein at least one nozzle is dimensioned and arranged to sprinkle the heated condensation water inside a first air duct and/or second air duct and/or any subsequent air ducts of the ventilation system.

9. A method for use in a ventilation system configured to be self-cleaning, wherein said method comprises:
   filtering exhaust air led through a filtration unit by at least one air duct;
   collecting condensation water from the exhaust air in a condensation chamber, wherein the condensation chamber is comprised in a battery part of a heat pump, the battery part being configured to extract energy from the passing air;
   heating the condensation water to a temperature equal to or above 65 degrees Celsius with a heating element; and sprinkling the condensation water in one or more of the filtration unit, at least one of the at least one air duct, and/or the condensation chamber using a sprinkler system, thereby providing self-cleaning of the ventilation system utilizing the condensation water.

10. The method according to claim 9, wherein the heating element is a hot gas conduit of said heat pump.

11. The method according to claim 9, wherein the filtration unit comprises at least one centrifugal separation filter.

12. The method according to claim 11, wherein the at least one centrifugal separation filter is run in a reverse mode during operation.

13. The method according to claim 9, wherein the sprinkler system comprises at least one sprinkler nozzle that sprinkles the condensation water in the filtration unit.

14. The method according to claim 13, wherein the filtration unit comprises at least one centrifugal separation filter, wherein at least one sprinkler nozzle sprinkles the condensation water inside the at least one centrifugal separation filter.

15. The method according to claim 9, wherein the heat pump comprises a hot gas conduit, wherein the heat pump collects condensation water in the battery part and heats the collected condensation water utilizing the hot gas conduit, the heat pump thus acting as the condensation chamber and the heating element in the system.

16. The method according to claim 13, wherein the heat pump comprises a hot gas conduit, and wherein at least one sprinkler nozzle is formed as a plurality of separate nozzles and/or a series of nozzles attached to the hot gas conduit or as a hole or opening or series of holes and/or openings in the hot gas conduit.

17. The method according to claim 16, wherein at least some of the sprinkler nozzles are dimensioned and arranged to sprinkle the heated condensation water inside the filtration unit comprised in the ventilation system.

18. The method according to claim 13 wherein at least one nozzle is dimensioned and arranged to sprinkle the heated condensation water inside the condensation chamber; and/or wherein at least one nozzle is dimensioned and arranged to sprinkle the heated condensation water inside a first air duct and/or second air duct and/or any subsequent air ducts of the ventilation system.

* * * * *